Figure 2:
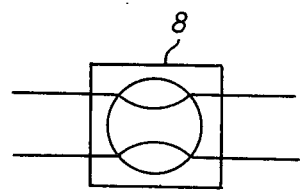

United States Patent [19]

Stolt

[11] 4,014,383
[45] Mar. 29, 1977

[54] METHOD OF HEATING HEAT EXCHANGER UNIT

[75] Inventor: Nils Lennart Stolt, Lund, Sweden

[73] Assignee: Alfa-Laval AB, Tumba, Sweden

[22] Filed: Jan. 20, 1975

[21] Appl. No.: 542,590

[30] Foreign Application Priority Data

Feb. 25, 1974 Sweden .......................... 74024548

[52] U.S. Cl. ............................ 165/95; 99/452; 165/66; 165/97

[51] Int. Cl.² ........................................ F28F 27/02

[58] Field of Search .................. 165/1, 66, 97, 95; 99/452, 453; 134/18

[56] References Cited

UNITED STATES PATENTS

| | | | |
|---|---|---|---|
| 2,159,110 | 5/1939 | Swarr .................. | 165/66 |
| 2,170,402 | 8/1939 | Faust .................. | 165/66 |
| 2,392,021 | 1/1946 | Wildermuth .......... | 165/66 |
| 2,734,565 | 2/1956 | Lockman .............. | 165/97 |
| 3,533,840 | 10/1970 | Holm .................. | 99/452 |

Primary Examiner—Albert W. Davis, Jr.
Assistant Examiner—Daniel J. O'Connor
Attorney, Agent, or Firm—Cyrus S. Hapgood

[57] ABSTRACT

In a heat exchanger unit having a heating section and a regenerative section, the product to be heat treated is first passed through the regenerative section to preheat the product, thence through the heating section and then back through the regenerative section to recover heat from the product. In the regenerative section, the return flow of the product is counter-current to its incoming flow; but when the exchanger unit is to be heated, as for cleaning or sterilizing, a liquid other than the product is passed through the regenerative and heating sections in the same path as the product flow except that the incoming and return flows of the liquid through the regenerative section are concurrent to each other.

1 Claim, 2 Drawing Figures

METHOD OF HEATING HEAT EXCHANGER UNIT

The present invention relates to a method of rapidly heating a heat exchanger unit comprising a heating section for heating a product, and a regenerative section through which the product passes for preheating it before reaching the heating section and through which the product again passes to recover heat therefrom after the heating section, the exchange of heat in the regenerative section being effected in a countercurrent flow pattern.

Heat exchanger units of this kind are used in pasteurization plants, for example. In order to provide for the best possible heat economy, the rate of heat recovery has been increased substantially during recent years. Thus, the rate of heat recovery of modern units is now above 90%. However, this high rate of heat recovery causes serious problems in connection with the heating and cleaning of plants of this kind. Before starting up or when cleaning a plant, it is desirable that the plant be heated rapidly to the desired temperature. However, such rapid heating is counteracted by the efficient heat recovery in the regenerative section of the heat exchanger unit. During normal operation of the plant, the regenerative section functions as a combined cooler and preheater in which the hot product coming from the heating section is cooled, and the heat thereby obtained is utilized for preheating the product before it passes into the heating section.

The product thus passes through the regenerative section before as well as after the heating section, and in order to obtain the best possible cooling and preheating, the exchange of heat in the regenerative section takes place in a countercurrent flow pattern. As is known, this flow pattern provides for an uneven distribution of temperature through the actual section of the plant, and this in turn causes the above-mentioned problems during the heating of the plant. Owing to the uneven temperature distribution, considerable time is required until a sufficiently high temperature for a cleaning or other desired operating has been obtained throughout the regenerative section.

By utilizing the method according to the present invention, it has proved possible to eliminate this problem in a simple and effective way and to obtain a considerable reduction of the heating time during cleaning and sterilization. It may be mentioned as an example that the heating time in a plant has been reduced from 25 minutes to only 5 minutes by the practice of the invention. The method according to the invention is characterized in that the flow pattern through the regenerative section is adjusted from countercurrent to concurrent when the unit is to be heated, as for cleaning or sterilizing.

Figure 1:
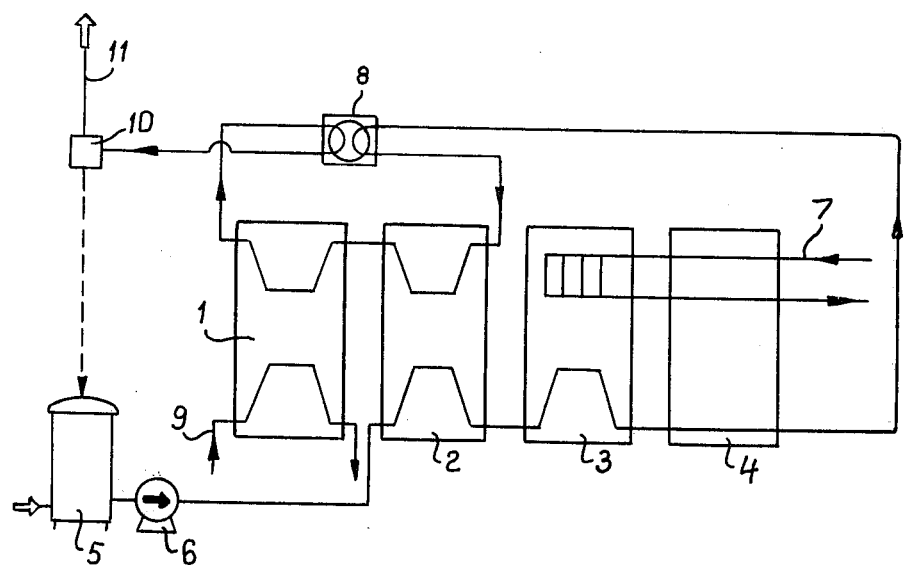

The invention will be described in detail below with reference to the accompanying drawing, in which FIG. 1 is a simplified flow diagram of a pasteurizing plant, and FIG. 2 is an enlarged schematic view of a valve included in the plant.

The pasteurizing plant as shown in FIG. 1 comprises a cooling section 1, regenerative section 2, a heating section 3, and a so-called holding section 4. During normal operation, the product enters via a balance tank 5 and a pump 6 and is conducted through the regenerative section 2 where it is preheated and thence through the sections 3 and 4. In the section 3 the product is heated to pasteurizing temperature, and the product is then held at this temperature for a predetermined period of time in the section 4. Sections 3 and 4 are charged with steam through a conduit 7. From the section 4 the product is conducted via a valve 8 to the regenerative section 2 in which a first cooling takes place and is then conducted through the cooling section 1 which is connected to a cooling water conduit 9. After the final cooling to the desired temperature in the cooler 1, the product is conducted via the valve 8 through a valve 10 to an outlet 11. As is shown in FIG. 1, the exchange of heat in sections 1 and 2 is effected in a countercurrent flow pattern.

When the plant is to be heated for cleaning or sterilizing, the valve 8 is adjusted to the position shown in FIG. 2, whereby a reversed flow direction is obtained through the cooler 1 and the regenerative section 2. The supply of cooling water to the cooler 1 via conduit 9 is, of course, shut off during heating, and the valve 10 is adjusted so that the used liquid, such as water, is returned to the tank 5 (as shown by a dashed line in FIG. 1), whereby system forms a closed circuit. Since the flow through the regenerative section 2 is now concurrent, a generally uniform distribution of temperature is obtained throughout this section, and the heating of the system is not counteracted to any appreciable extent. A considerable reduction of the heating time is thus obtained, as previously mentioned. The supply of heat is effected in the same way as has been described above, by supplying steam through the conduit 7.

In addition to the shortened heating time, a further advantage is obtained by the present method. That is, the reversed flow through the cooler 1 and the regenerative section 2 has a favorable influence on the result of the cleaning in that the cleaning action of the flushing becomes more efficient. This is because remaining parts of the product are more easily removed if the cleaning agent flows in the direction opposite to the flow direction of the product.

1. In the operation of a heat exchanger unit having a heating section for heating a product and also having a regenerative section through which the product passes for preheating it before reaching the heating section and through which the product again passes to recover heat therefrom after leaving the heating section, the method which comprises passing the product countercurrently through the regenerative section as the product flows to and from the heating section, and heating the unit, as for cleaning or sterilizing, by passing a liquid other than said product in a first flow through the regenerative section to and through the heating section and thence back through the regenerative section in a second flow which is concurrent to said first flow.

* * * * *